Patented Sept. 14, 1954

2,689,217

UNITED STATES PATENT OFFICE 2,689,217

PRODUCTION OF CHLORINE OXIDES BY ELECTRIC DISCHARGE

William J. Cotton, Butler, Pa., assignor to Mathieson Chemical Corporation, a corporation of Virginia No Drawing. Application October 25, 1949, Serial No. 123,529

7 Claims. (Cl. 204—164)

This invention relates to the production of valuable oxides of chlorine higher than the monoxide by direct oxidation of chlorine under the influence of electric discharge conditions. In a special aspect, it relates to the production of mixed oxides of chlorine predominating in chlorine dioxide and in another aspect it relates to the production of mixed oxides predominating in chlorine trioxide.

Many investigators have attempted to react chlorine and oxygen by means of electrical activation but with doubtful success. Insofar as I know these trials resulted only in production of small amounts of chlorine monoxide, or hypochlorous anhydride, where oxidation at all appeared to be effected. I have now discovered that by controlling the conditions of the electric discharge so that the discharge is non-luminous at low frequency or ranging from non-luminous to a light brush type or fluffy luminosity at high frequency, I am able to produce oxides predominating in either the commercially desirable chlorine dioxide or the apparently wholly novel chlorine trioxide, $Cl_2O_3$. Under these discharge conditions the greater part of the electrical energy delivered to the reactor electrodes goes to chemical energy instead of heat and light. Chlorine dioxide has special commercial value because when treated with a reducing agent such as carbon and absorbed in sodium hydroxide, sodium chlorite may be readily produced. Sodium chlorite as is well-known is a highly convenient and concentrated source of available chlorine for bleaching and water-treating operations, for example. Chlorine trioxide obviously is even more valuable as it is absorbed directly by sodium hydroxide to give pure sodium chlorite. So far as I know, chlorine trioxide has not been prepared and its existence has never been established. A few references to chlorine trioxide have appeared in the early chemical literature, but later investigators have established conclusively that mixtures of chlorine and chlorine dioxide had been mistaken in these instances for chlorine trioxide.

In producing chlorine dioxide and chlorine trioxide by my new methods, I have generally employed the procedure and equipment described in detail in a series of seven articles published by me in the "Transactions of the Electrochemical Society" (1947) and in my issued Patents 2,468,-173; 2,468,174; 2,468,175; 2,468,177; 2,485,476; 2,485,477; 2,485,478; 2,485,479; 2,485,480 and 2,485,481. In producing chlorine oxides, I have used electrical circuits and equipment selected and controlled according to the general considerations described in these publications. I have employed ordinary commercial cylinder oxygen and chlorine without special purification or drying in approximately stoichiometrical proportions, advantageously about one-third chlorine and about two-thirds oxygen. I have used glass reactors of the general type described in the above patents, equipped with nickel electrodes, designed for low frequency discharge alone, high frequency discharge alone, and for a crossed discharge utilizing both high and low frequency discharges. Other electrode materials such as tantalum or cobalt, for example, may be utilized bearing in mind the relative corrodibility of metallic materials in an oxidizing atmosphere of chlorine. In most instances, however, a protective chloride film is formed and under the cool reactor temperature further decomposition does not occur.

I have found that the nature of the discharge is critical with respect to activating the reaction so as to produce useful yields of chlorine oxides and with respect to the character of the oxides produced. Thus I have found that it is necessary to control the discharge conditions so that the discharge is of a non-luminous or only a weakly luminous character without development of appreciable amounts of heat and light. I have also found that chlorine has a rather high dielectric strength and that it is accordingly difficult to get a continuous discharge going in the presence of high concentrations of chlorine. Small amounts of water vapor in the charge appear to be useful in this respect and the addition of other gases such as argon is often advantageous. I have also found that increasing the pressure after the discharge has been initiated to about 300 mm. and above contributes to increased conversion.

The effluent gases from the reactor are passed to an absorption train. In my experimental work, I have used an absorption train adapted for the analysis of the effluent gases, but in actual operation the gases are advantageously passed to a condensation and distillation system for separation of unreacted chlorine and oxygen for recycle followed by absorption recovery of the chlorine oxides in adsorption materials designed to produce commercial products.

In the early runs, samples of the product were analyzed for hypochlorite and chlorite to determine conversion as chlorine dioxide. No provision was made for distinguishing between chlorine dioxide and chlorine trioxide as the occurrence of the latter was wholly unexpected. A balloon flask inserted in the gas train exit between the reactor and the vacuum pump was calibrated for volume. A mercury manometer teeing into the gas line between the reactor and the sample balloon flask indicated the pressure under which the reactor was operated and the sample collected. By-pass around the sample flask was used to pass the gas stream around the sample gas when desired. It was thus possible to collect a known volume of sample at a known pressure without stopping the operation of the equipment. The sample flask was equipped with a funnel neck so designed that by turning the ground stopper thereon a mixture of neutral buffer of mixed mono and disodium phosphates together with a 10 percent solution of potassium iodide could be run into the flask by virtue of the suction effect of the partial vacuum existing within the flask. The buffer and potassium iodide solution were followed by a distilled water wash. After shaking the contents of the flask, the contents were transferred to a wide mouth 500 cc. Erlenmeyer flask and the liberated iodine titrated with a 0.1 N sodium thiosulfate solution using starch solution as indicator. When the blue of the starch iodide had been dispelled, enough 1:3 acetic acid solution was added to lower the pH of the solution to approximately 3.1. At this pH the iodine corresponding with the chlorine dioxide was liberated and was titrated with a second lot of standard 0.1 N sodium thiosulfate solution.

The possible occurrence of ozone in the product was checked in a series of runs by inserting a manganese dioxide tube in the absorption train in order to check oxidizing power before and after passage through the manganese dioxide. Manganese dioxide decomposes ozone but does not affect chlorine dioxide. The results indicated conclusively that there is no ozone in the product.

I observed, however, that in the early runs a heavy gaseous material was formed and tended to remain for many hours in the apparatus. A new analytical procedure accordingly was adopted to distinguish between production of chlorine dioxide and production of the new chlorine oxide which was identified as chlorine trioxide. A train of three absorption towers was employed. The towers were 22 mm. Pyrex glass packed for 24" with 6-8 mm. glass beads. The pressure drop was low (2-3 mm. water) even under vacuum so that large flows of absorption solution could be used as well as a very slow drip. The packing was arranged carefully with each layer having 7 beads to avoid gas paths of uneven resistance and to enable the surface tension of the liquid to keep a more even continuous film of liquid going down at all times. Surfaces were kept grease free. The absorbing liquid was fed to the tower through a stopcock from a calibrated reservoir arranged with stopcocks and vacuum releases so that liquid could be added at any time without interfering with the pressure in the system. The spent absorbing liquid was caught in a semiball joint round bottom flask equipped with a goose neck seal to prevent by-passing. The first two towers were sodium hydroxide absorption towers while the last tower was a potassium iodide tower. It was found that all of the chlorine and the chlorine trioxide were collected in the first sodium hydroxide tower. Under similar conditions of pressure, concentration and flow rate it was found with known amounts of chlorine dioxide in the gas stream that 20% of the chlorine dioxide was absorbed in the first sodium hydroxide tower giving equimolar portions of sodium chlorite and sodium chlorate. In addition all of the chlorine was absorbed giving approximately equimolar portions of sodium hypochlorite and sodium chloride. More of the chlorine dioxide was absorbed in the second sodium hydroxide tower, usually about 20% of the remainder. The third tower containing potassium iodide absorbed all of the chlorine dioxide present in the gas passed through it. For the purposes of convenience in later operations, potassium iodide solution was used in the second tower since all the chlorine dioxide was not absorbed there and no chlorine passed the first sodium hydroxide tower. Due to the presence of chlorine trioxide, much more than an equimolar ratio of sodium chlorite to sodium chlorate was found in the sodium hydroxide tower. For purposes of calculation, therefore, it was assumed that one-quarter of the sodium chlorite found there was due to absorption of chlorine dioxide and the remainder to the absorption of chlorine trioxide.

The formation of chlorine trioxide is corroborated by observation of a lower chlorite ion content in the potassium iodide tower than in the sodium hydroxide tower where the trioxide as a pure anhydride would be expected to dissolve rapidly in sodium hydroxide to give chlorite. The difference between the chlorite found in sodium hydroxide and that which should have been found based on the potassium iodide tower was calculated as chlorine trioxide. Also it was noted that there was too little chlorate in the sodium hydroxide tower to account for the unexpected chlorite content by complete absorption of chlorine dioxide. Chlorine trioxide was observed to be a relatively stable substance having a boiling point of about 150° C. Because of its low vapor pressure it is readily separable from chlorine and persists on the reactor walls and in the tubes for hours. Its production is assisted by equipping the reactions equipment for flushing by gases following each run.

I have found that high frequency discharge operation is particularly advantageous in producing oxides of chlorine higher than the monoxide. In creating and controlling high frequency discharge conditions, I may use a conventional oscillator circuit, usually comprising a step-up transformer, rectifier and filter, amplifier, tank circuit and linkage circuit. The voltage is conveniently controlled by a variac and the current is kept down to a minimum. I have found, as pointed out in my publications referred to above, critical frequencies for activation of chemical reactions, which may be determined by plotting the product of voltage and amperage against successive empirical frequencies. The voltage-ampere product tends to show a marked dip in magnitude at a critical frequency. For production of chlorine oxides I have found that a cyclic energy quantum equivalent to a sinusoidal frequency of about 2.68 to 1.87 mc. (112 to 160 meters) is useful and that a cyclic energy quantum equivalent to a sinusoidal frequency of about 2.40 to 2.06 mc. (125 to 145 meters) is particularly useful. As described in my above referred to publications, nickel and cobalt electrodes have critical electrode frequencies within this range.

The voltage employed according to my invention depends upon the composition of the gases, the pressure, the electrode material and the electrode gap. Chlorine has high dielectric strength and accordingly the voltage must be increased to obtain the same discharge with higher proportions of chlorine. As the pressure is increased the voltage required will be increased and the voltage appears to vary directly with the gap.

In high frequency work according to my invention, the character of the discharge is critical in determining useful yield and in determining the character of the gases produced. Thus I have found at a wave length of about 125 to 145 meters (2.40 to 2.06 mc.) a light fluffy, or "caterpillar," luminous discharge is effective in producing useful yields of chlorine oxides, particularly chlorine trioxide. If the luminous discharge is changed to a relatively thin and stringy type, production of chlorine dioxide is favored. In either case, it is advantageous to operate at as low a volt-ampere relationship as possible for favorable yields. The nature of the reaction and the character of the results will be illustrated in the following examples.

EXAMPLE I

A four-legged glass reactor of the type described in my above patents was equipped with two 12/4 nickel electrodes. By 12/4 I mean that the altitude of the tip is 12-eighths of an inch and the diameter of the base of the conical tip is 4-eighths inch. The angle at the tip is 18.42°. The electrode gap was 11 mm. The electrodes were arranged in a vertical position with the hot or high potential electrode in the lower position. Atmospheric pressure was 735 mm. The temperature of the entering gases was 30.5° C. and the pressure within the reactor was maintained at 59 mm. at a charge rate of 150 cc. per minute of chlorine and 330 cc. of oxygen. During the run a frequency of 2.10 megacycles or 142.8 meters wave length was employed with a peak voltage of 595 volts at the point of discharge. The current was less than 5 milliamperes and the volt amperage product was calculated as 2.11.

A sample amounting to 1117.2 ccs. was collected in the analytical flask which when corrected to normal temperature and pressure amounted to 77.6 cc. The yield of chlorine oxides higher than hypochlorous anhydride and calculated as chlorine dioxide amounted to 16.3 wt. per cent per pass based on the chlorine. The energy yield was 1164 grams of chlorine dioxide per kilovolt ampere hour. The power factor was not determined, but it was known to be relatively low.

EXAMPLE II

In this run a similar reactor arrangement and charge rate was employed. The atmospheric pressure was 737.6 mm. and the temperature of entering gases was 32.0° C. The reactor pressure was maintained at 64 mm. and a frequency of 2.40 megacycles or 125 meters wave length was employed. The voltage at the point of discharge was 752 volts while the current was less than 5 milliamperes. Under these conditions the discharge was greenish and stringy in character. Again a 1117.2 cc. sample was collected which calculated to 81.5 cc. for conditions of normal temperature and pressure. Under these conditions the temperature between the inlet and outlet gas increased only 0.9° C., while the conversion of chlorine to chlorine oxides higher than hypochlorous anhydride and calculated as chlorine dioxide amounted to 15.1 wt. per cent based upon the chlorine.

In other runs in which a frequency of 2.40 megacycles or 125 meters wave length was employed, it was noted that in general the yields increased with increase of pressure up to about 300 to 350 mm. of mercury. Thereafter the yield appears to level off until higher pressures above atmospheric favoring reaction on kinetic principles are reached. In a group of runs employing the fluffy type luminous type discharge, sometimes known as the "caterpillar" discharge, it was noted that the bulk of the production consisted of chlorine trioxide. As the wave length increases from 125 meters to 150 meters, the yield per pass passes through a maximum at about 133 meters. Experiments at about 60, 300 and 700 mm. indicate that the yield per pass of chlorine oxides increases with pressure.

I have also determined in experimental runs that the use of high frequency corona and spark discharges results in very low yields of useful chlorine oxides and the product distribution appears less desirable. In runs employing lower volt-ampere relationships and the non-luminous high frequency discharge, higher yields of mixed chlorine oxides were obtained than under luminous conditions. For example, in 7 runs with the non-luminous discharge, the average increment of oxidizing power was 2.11 equivalents per 100 equivalents, wheras 1.57 equivalents were obtained with the luminous high frequency discharge. The yield, however, appears to be about equally divided between chlorine dioxide and chlorine trioxide. By contrast luminous discharge conditions of the stringy sort favored chlorine dioxide production and conditions of the fluffy sort favored chlorine trioxide production. Although the oxides produced according to my invention generally predominate in those oxides which yield chlorite ion on hydrolysis, evidence of other oxides higher than hypochlorous anhydride was noted. For example, an oxide having the probable formula, $Cl_2O_2$, was observed as interfering with the hypochlorite analysis in at least one instance, and in some of the luminous runs, particularly those of higher volt-amperage relationship, a fog or mist of chlorine hexoxide $Cl_2O_6$ was produced.

In working with low frequency electrical discharges; i. e., 10 to 10,000 cycles but for practical reasons 60 to 25 cycles, I have found that there is a significant difference in the character of yield of chlorine oxides as between non-luminous discharge and luminous discharge conditions. By controlling the reactor conditions and power delivered to obtain a non-luminous discharge, useful yields of chlorine oxides are obtained. Under conditions of the luminous discharge, yields of an order too low for practical usefulness are obtained. In obtaining acceptable yields, I have found that it is important to carefully stabilize the power delivered to the reactor as the character of the energy wave is important with respect to yield and appears to depend upon the power factor, the voltage distortion factor and the current distortion factor. Distortion can be controlled by varying the reactor capacity. Thus I have found that the per cent of conversion increases steadily as the reactor condition shifts from one of a low capacity-to-inductance ratio to one of a high capacity-to-inductance ratio. These principles will be illustrated in the following data of Example III.

EXAMPLE III

In these runs the conventional reactor was used and the reactor conditions are tabulated below. The electrical circuit comprised the application of 110 volt, 60 cycle current to a control variac. The output of the variac was delivered simultaneously to twin neon transformers having a step-up ratio of approximately 27 to 1. The transformers were connected in parallel in order to minimize fluctuations in wave form. Provision was made in the circuit for cutting in an inductance in series with the primary of the transformers and for placing one or two capacitors in parallel across the primary going to the transformers. The data tabulated below indicate the different conditions of the reactor power as— "as is" for the current delivered directly to the transformers, 26.9 $\mu$H for the provision of the inductance, and 0.1 mfd. or 0.2 mfd. for provision of one or two capacitors respectively.

*Table 1*

PERCENT CONVERSION OF CHLORINE TO CHLORINE DIOXIDE WITH CHANGE OF PRIMARY WAVE CHARACTERISTICS

| Discharge | Luminous | | Non-Luminous | | | | Luminous | | |
|---|---|---|---|---|---|---|---|---|---|
| Gas Flow, Total, cc./Minute | 480 cc. | Throughout | | | | | | | |
| Percent Cl₂ | 31.2% | do | | | | | | | |
| Primary | As is | 0.1 Mic. | | 26.9 $\mu$H | 0.2 Mic. | As is | 0.2 Mic. | 26.9 $\mu$H. | |
| Power: | | | | | | | | | |
| Volts | 88 | 88 | 88 | 88 | 88 | 88 | 88 | 88. | |
| ma | 584 | 584 | 92 | 92 | 92 | 92 | 547 | 566. | |
| Kva | .0514 | .0514 | .0081 | .0081 | .0081 | .0081 | .0481 | .0498. | |
| Pres. mm. Hg | 60 | 60 | 61 | 61 | 63 | 65 | 66 | 64. | |
| Gap | 27 mm | Throughout | | | | | | | |
| Electrodes: | | | | | | | | | |
| Material | Nickel | do | | | | | | | |
| Size and Taper | 12/4 | do | | | | | | | |
| Results: | | | | | | | | | |
| Percent Conversion | 4.52 | 7.35 | 8.87 | 3.52 | 10.74 | 5.52 | 8.07 | 5.21. | |
| Gms. ClO₂ Per kva. h | 37.3 | 54.7 | 341.0 | 191 | 548 | 302 | 55.7 | 41.6. | |

In other experimental runs according to my invention a crossed discharge combining high frequency and low frequency conditions was employed. In these runs the per cent chlorine in the feed varied from 4.58 to 34.1. The electrode gaps were 11 mm. for the vertical high frequency electrodes and 22 to 31 mm. for the horizontal low frequency electrodes. The high frequency power ranged from 560 to 760 in peak voltage and was less than 5 milli-amperes. The wave length of the high frequency component was 125 meters and 142.8 meters or 2.40 and 2.10 megacycles. The low frequency power ranged from 39 to 104 volts at the primary and 230 to 740 milli-amperes. The total kilo-volt-ampere factor ranged from a low of .01224 to .07395. The pressure was varied from 24.6 mm. to 139 mm. Best yields were obtained under non-luminous discharge conditions.

The crossed discharge reaction has the significant advantage of reducing power requirements, for only as little as 4 to 8 per cent of the total energy need be supplied as relatively expensive high frequency energy while the rest may be supplied as relatively cheap 60-cycle energy. Maximum yields, however, are obtained when the high frequency component constitutes from about 35 to 55 per cent of the total energy supplied at the point of discharge. The yield then usually amounts to about 3 times that obtainable by the 60 cycle discharge alone.

I claim:
1. The method of producing chlorine oxides higher than the monoxide which comprises exposing a stream of chlorine and oxygen in a reaction zone to a crossed electric discharge combining a non-luminous dark electric discharge under conditions of a relatively low frequency of about 10 to 10,000 cycles per second and an electric discharge ranging from a non-luminous dark discharge to a luminous glow discharge under conditions of relatively high frequency of about 2.68 to about 1.87 mc. (112 to 160 meters), both discharges being at relatively low voltage-amperage relationships with low heat and light production, recovering the reaction mixture, and removing unreacted chlorine and oxygen from the reaction mixture.

2. The method of producing chlorine oxides higher than the monoxide which comprises exposing a stream of chlorine and oxygen in a reaction zone to an electric discharge ranging from non-luminous dark discharge to luminous glow discharge under conditions of relatively high frequency of about 2.68 to about 1.87 mc. (112 to 160 meters) and at a relatively low voltage-amperage relationship with low heat and light production, recovering the reaction mixture, and removing unreacted chlorine and oxygen from the reaction mixture.

3. The method of producing chlorine oxides higher than the monoxide which comprises exposing a stream of chlorine and oxygen in a reaction zone to a non-luminous dark electric discharge under conditions of high frequency of about 2.68 to about 1.87 mc. (112 to 160 meters) and at a relatively low voltage-amperage relationship with low heat and light production, recovering the reaction mixture, and removing unreacted chlorine and oxygen from the reaction mixture.

4. The method of producing chlorine oxides higher than the monoxide which comprises exposing a stream of chlorine and oxygen in a reaction zone to a non-luminous dark electric discharge under conditions of relatively low frequency of about 10 to 10,000 cycles per second and at a relatively low voltage-amperage relationship with low heat and light production, recovering the reaction mixture, and removing unreacted chlorine and oxygen from the reaction mixture.

5. The method of producing chlorine oxides higher than the monoxide which comprises exposing a stream of chlorine and oxygen in a reaction zone to a luminous glow discharge under conditions of relatively high frequency of about 2.68 to about 1.87 mc. (112 to 160 meters) and at a relatively low voltage-amperage relationship with low heat and light production, recovering the reaction mixture, and removing unreacted chlorine and oxygen from the reaction mixture.

6. The method of producing chlorine oxides predominating in chlorine dioxide which comprises exposing a stream of chlorine and oxygen in a reaction zone to a stringy, luminous glow discharge under conditions of relatively high frequency of about 2.68 to about 1.87 mc. (112 to 160 meters) and at a relatively low voltage-amperage relationship with low heat and light production, recovering the reaction mixture, and removing unreacted chlorine and oxygen from the reaction mixture.

7. The method of producing chlorine oxides predominating in chlorine trioxide which comprises exposing a stream of chlorine and oxygen in a reaction zone to a fluffy, luminous glow discharge under conditions of relatively high frequency of about 2.68 to about 1.87 mc. (112 to 160 meters) and at a relatively low voltage-amperage relationship with low heat and light production, recovering the reaction mixture, and removing unreacted chlorine and oxygen from the reaction mixture.

References Cited in the file of this patent

UNITED STATES PATENTS

| Number | Name | Date |
|---|---|---|
| 523,262 | Cannot | July 17, 1894 |
| 758,775 | Pauling | May 3, 1904 |
| 2,468,177 | Cotton | Apr. 26, 1949 |

FOREIGN PATENTS

| Number | Country | Date |
|---|---|---|
| 9,332 of 1891 | Great Britain | Apr. 2, 1892 |

OTHER REFERENCES

Journal Physical Chemistry, vol. 27 (1923), pp. 76–77.

Comanducci: Chemical Abstracts, vol. 4 (1910), p. 2231.

Byrns et al.: Chemical Abstracts, vol. 29 (1935), p. 405.

Bodenstein et al.: Chemical Abstracts, vol. 24 (1930), p. 5249.